Feb. 21, 1967  J. R. URSCHEL  3,304,974
KNIFE ASSEMBLY FOR BEAN SNIPPER MACHINE
Filed June 1, 1964  4 Sheets-Sheet 2

INVENTOR.
JOE R. URSCHEL
BY Charles S. Penfold
ATTORNEY

Feb. 21, 1967   J. R. URSCHEL   3,304,974
KNIFE ASSEMBLY FOR BEAN SNIPPER MACHINE
Filed June 1, 1964   4 Sheets-Sheet 3
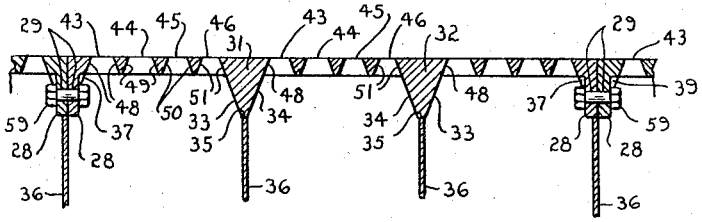
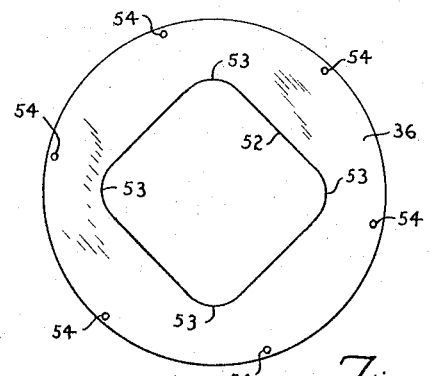
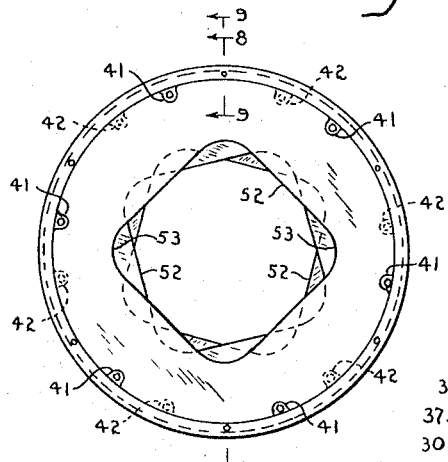
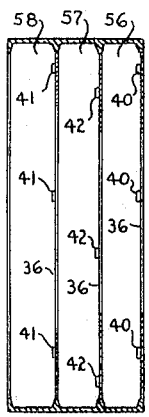
INVENTOR.
JOE R. URSCHEL
BY
Charles S. Penfold
ATTORNEY Feb. 21, 1967 J. R. URSCHEL 3,304,974
KNIFE ASSEMBLY FOR BEAN SNIPPER MACHINE
Filed June 1, 1964 4 Sheets-Sheet 4
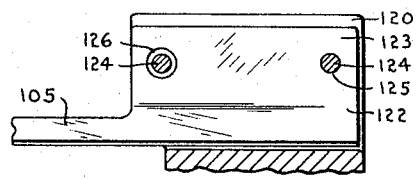
Fig.-14
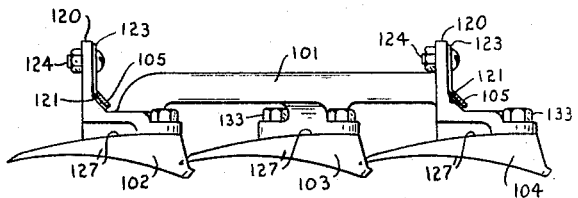
Fig.-13
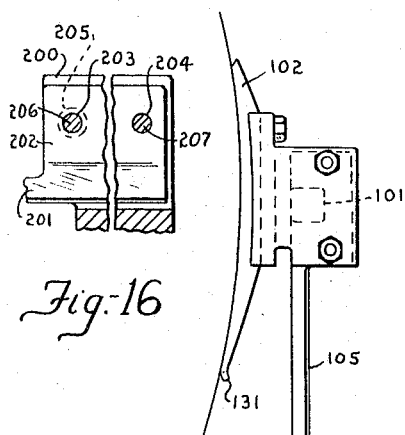
Fig.-16
Fig.-12
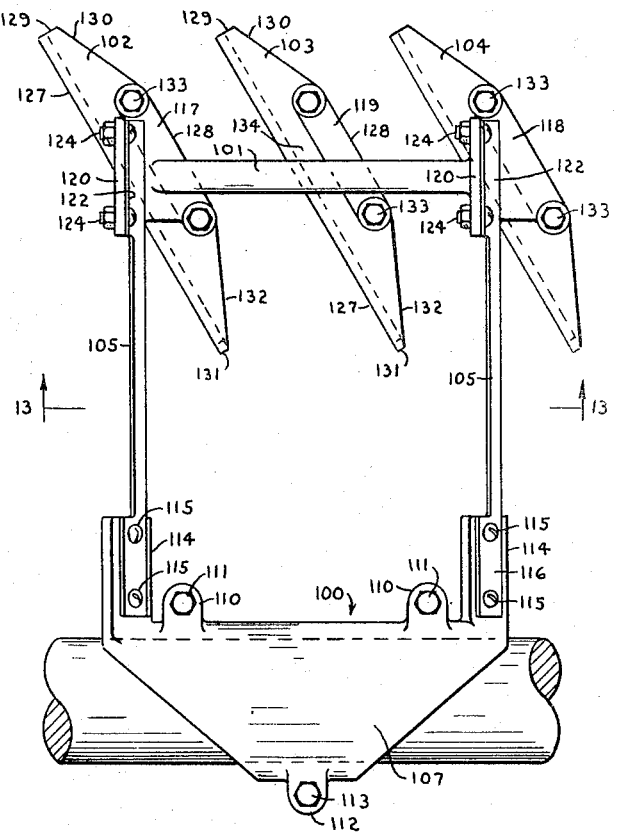
Fig.-11
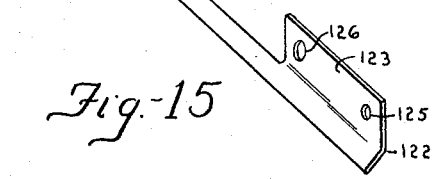
Fig.-15
INVENTOR.
JOE R. URSCHEL
BY Charles A. Penfold
ATTORNEY

United States Patent Office 3,304,974
Patented Feb. 21, 1967

3,304,974
KNIFE ASSEMBLY FOR BEAN SNIPPER MACHINE
Joe R. Urschel, 202 Michigan Ave., Valparaiso, Ind. 46383
Filed June 1, 1964, Ser. No. 371,587
18 Claims. (Cl. 146—86)

The subject invention relates generally to a machine for preparing a food product for future use and more particularly is directed to a machine whereby the ends of string beans can be readily removed or snipped off.

The invention embodies principles of design and construction constituting significant improvements over the machines disclosed in my U.S. Patents, Numbers 2,144,-730 and 2,075,516 respectively dated April 19, 1938, and April 5, 1955. The machines exemplified in the patents have been and are presently being employed extensively and successfully in the food processing industry. These machines, among other things, comprise an inclined hollow rotatable cylinder provided with peripheral slots and apertured partitions or baffles which divide the cylinder into chambers or pockets, and knives for cutting off the ends of the beans as they protrude through the slots while they are tumbling about and traveling successively through the chambers. The apertures or openings in the partitions are round and out of registry with one another so that the beans will not lay across the top of the openings and move through the cylinder without having their ends presented for protrusion through the slots. Such an organization has proved only partially effective because some beans will tumble together and form themselves into a rope which will wind and find its way through the openings in the cylinder without falling into the chambers formed by the partitions. Also, the size of the openings and the spacing of the partitions in those machines were designed and constructed to accommodate beans which were somewhat smaller than the green and wax beans now being grown which have a greater diameter and length.

With the foregoing in mind, one of the important objects of the subject invention is to provide a machine whereby its productive capacity with respect to cutting and flow of the product through the cylinder is materially increased, these factors being accomplished, at least in part, by spacing the partitions farther apart and providing them with rectangular apertures or openings out of registry with one another whereby to better accommodate all sizes of beans and particularly those of the larger varieties now being grown. The provision of any opening, such as a rectilinear one of the character shown or a triangular one in each partition has proven to be more effective than the round ones shown in my Patents.

The cylinder shown in the above described patented machines is also comprised of a multitude of individual arcuate cast sections which are secured together by utilizing an appreciable number of circumferentially spaced internal longitudinal rods which extend through internal raised integral portions of the sections, with fittings on the ends of the rods for holding the sections operatively assembled. These rods and raised portions of the sections interfere with the free tumbling and the travel of the beans in the chambers. Also, in some instances, the castings are not accurately formed, in which event, it not only becomes difficult to assemble the sections and rods but the edges of the sections fail to register or coincide so that internal surfaces arrises thereof tend to cut and/or retard the travel of the beans through the cylinder. Furthermore, external arrises of the sections, resulting from misalignment and/or registry of the sections, provide irregularities in the peripheral surface of the cylinder so that the knives will not correctly engage such surface to shear off the ends of the beans. Any irregularity in the external peripheral surface of the cylinder also causes damage to the knives and the knives cause damage to such surface.

Accordingly, another significant object of the invention is to design and construct a cylinder which is comprised of a minimum number of annular sections and means whereby these sections can be readily secured together in an end-to-end or abutting relationship without utilizing the rods in the patented machines, all of which serves to provide a stable and durable cylinder having more uniform inside and outside diameters and chambers which are substantially free of all obstructions which tend to damage the beans or otherwise interfere with their tumbling and travel through the cylinder.

Another object of the invention is to provide the annular sections of the cylinder with narrow internal annular ribs and integral tabs or ears on the ribs whereby to facilitate connecting the partitions to the sections for support on the ribs, and the provision of apertures in end flanges provided on the sections whereby to facilitate connecting the sections in abutting relationship by fittings extending through the apertures. Due to the tilt or inclination of the cylinder the beans during their travel therein are caused to press with greater force against the forward sides of the partitions than against their rear sides. Provision is made for welding threaded studs to the rear sides of the partitions so that the forward sides of the partitions will be completely smooth. These factors all contribute to providing a cylinder whereby anything therein which tends to lift the beans has been eliminated or reduced in size. as much as possible, and located where it will have the least lifting effect on the beans.

A further important object of the invention is to provide a plurality of knife assemblies, in which each assembly employs improved principles of design and construction whereby the knives are correctly engaged with the periphery of the cylinder for shearing off the ends of the beans.

A specific object of the machine is to provide a plurality of knife assemblies, in which each assembly is provided with means whereby substantially uniform pressure is applied to the knives to facilitate their engagement with the cylinder, while affording automatic corresponding retraction of the knives due to any accidental lateral displacement thereof with respect to the cylinder.

An important objective of the invention is to provide a knife assembly having improved means whereby to facilitate adjustment of the knives with respect to the attaching means of the assembly in a manner whereby the knives may be readily and correctly positioned against the periphery of the cylinder.

Specific objects of the invention are to provide a unique adjustment between knife holders and springs therefor and improvements with respect to the springs and the character of the knives.

Other objects of the invention are to provide a machine which offers advantages with respect to manufacture and assembly, replacement of worn parts, low cost of maintenance, and efficiency with respect to cutting and uniformity in the resultant product.

Additional objects and advantages of the machine, embodying one or more inventions, will become apparent after the description hereinafter set forth is considered in conjunction with the drawings annexed hereto.

In the drawings:

FIGURE 6 is an elevational view of one of a plurality of the partitions adapted for securement within the confines of the cylinder;

FIGURE 7 is an elevational view of the exit end of one of a plurality of annular sections comprising the cylinder;

FIGURE 8 is a section taken substantially on line 8—8 of FIGURE 7;

FIGURE 9 is an enlarged partial section of the cylinder taken substantially on line 9—9 of FIGURE 7, showing the mode of securing the annular sections together and the partitions to the sections;

FIGURE 10 is a partial perspective view showing the internal structure of one of the annular sections of the cylinder;

FIGURE 11 illustrates a modified form of knife assembly mounted on a support;

FIGURE 12 is a view showing the knife assembly mounted on a support in relation to a rotatable cylinder of the machine;

FIGURE 13 is a transverse section taken substantially on line 13—13 of FIGURE 11;

FIGURE 14 is a view showing a mode of adjustably connecting components of the knife assembly;

FIGURE 15 is a perspective view of one of a pair of resiliently flexible members constituting a component of the knife assembly; and FIGURE 16 is a modified form of an adjustable connection between resiliently flexible members and a knife structure.

Figure 1:
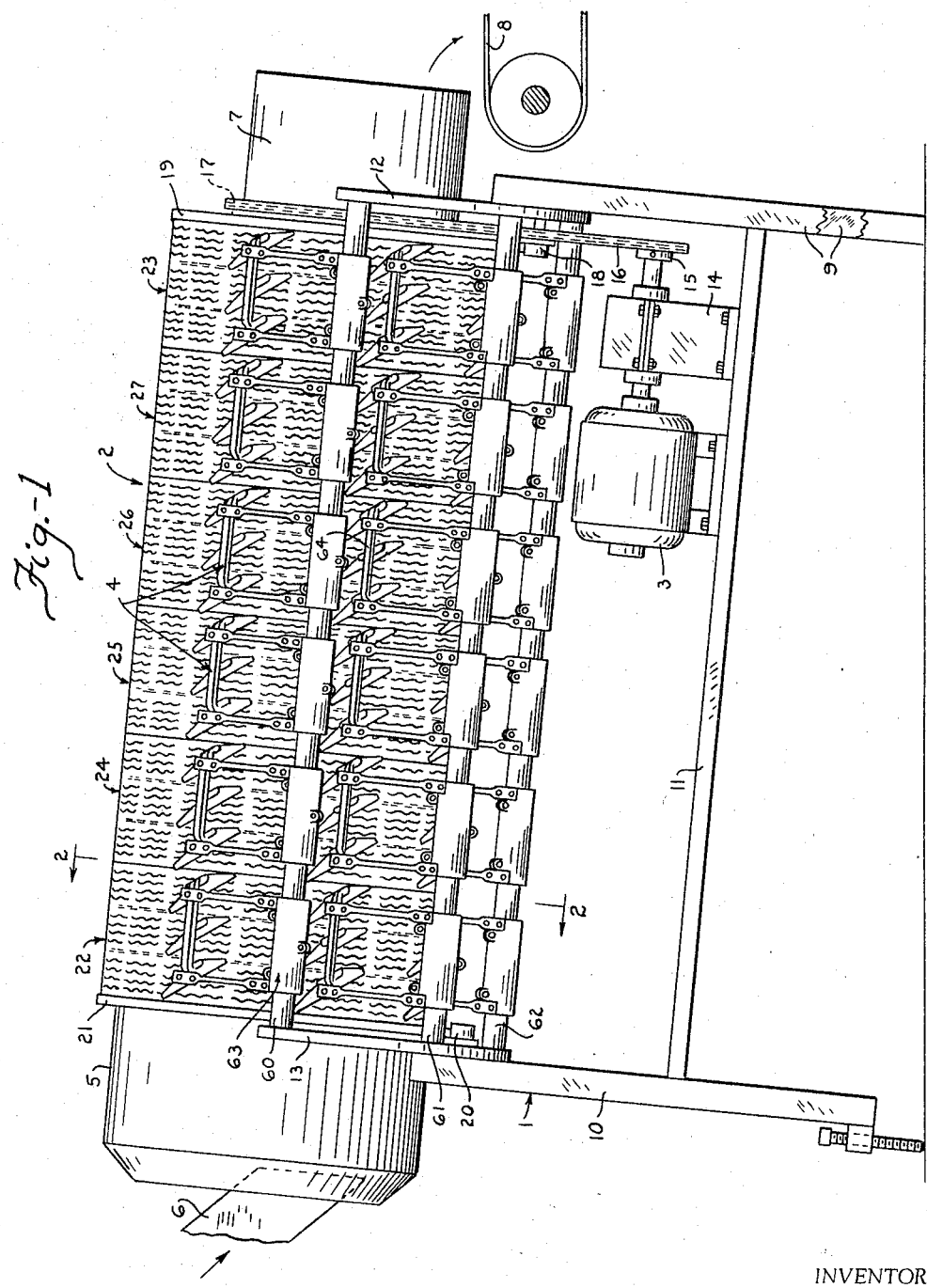
FIGURE 1 is a side elevational view of the machine embodying the invention or inventions.

The machine, among other things, comprises a rectangular frame generally designated 1, a cylinder generally designated 2, mounted on the frame for rotation, power means, such as a motor 3 for rotating the cylinder, and a plurality of knife assemblies generally designated 4. The cylinder is provided with chambers or pockets and is mounted in a tilted or inclined position with reference to the horizontal. The beans are introduced at its high end or inlet 5 through a chute 6 and discharged through an outlet 7 onto a conveyor 8. When the cylinder is rotated with a mass of beans therein, the beans tumble about and as they climb off the bottom of the cylinder and approach its top, they fall or drop back into one or more of the chambers or pockets and during this act of tumbling the ends of the beans are caused to protrude through the slots provided in the wall of the cylinder where they are cut off by the knives of the knife assemblies.

Figure 2:
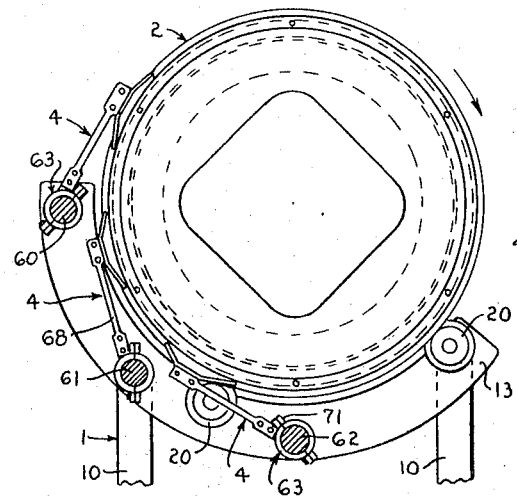
FIGURE 2 is a transverse section taken substantially on lines 2—2 of FIGURE 1, illustrating, among other things, the mode of mounting the cylinder for rotation.

Referring more particularly to the structure, above referred to, the rectangular frame may be designed and constructed as desired, but, as depicted in FIGURES 1 and 2, it is preferably comprised of a pair of short legs 9, a pair of taller legs 10, a platform 11 joining the legs, and arcuate members 12 and 13 respectively secured to and bringing the upper ends of the pairs of legs 9 and 10. The motor 3 and a speed reducer 14 operatively connected to the motor, are mounted on the platform. The reducer is provided with a shaft having a sprocket 15 keyed thereto and a chain belt 16 is connected to this sprocket and an annular toothed element 17 fixed on the cylinder for rotating or driving the latter at a predetermined rate of speed, such as 50 r.p.m. As evidenced in FIGURE 1, the lower ends of the taller legs 10 are preferably provided with adjustable means, such as screws, so that the tilt or inclination of the cylinder with reference to the horizontal may be varied whereby to assist in controlling the flow or travel of the beans through the cylinder.

The cylinder may be mounted on the frame in various ways but as illustrated in FIGURES 1 and 2, the arcuate member 12 bridging the legs 9 is preferably provided with a pair of rollers 18 which engage an annular track 19 carried by the cylinder. The arcuate member 13 on the legs 10 is correspondingly provided with rollers 20 which engage an annular track 21 carried by the cylinder. The relationship of the knife assemblies 4, rollers 18 and 20, and chain belt 16 is such that the cylinder is well supported for rotation.

The structural characteristics of the cylinder will now be described. As depicted in FIGURE 1 it is preferably comprised of a pair of annular end cast sections generally designated 22 and 23 and four corresponding intermediate annular cast sections generally designated 24, 25, 26, and 27, which are assembled together in an end-to-end abutting relationship. It will be noted that the end section 22 carries the annular track 21 and a cylindrical extension which may be considered as constituting the inlet 5, and that the end section 23 carries the track 19, the toothed element 17 and a tubular extension which may be considered as constituting the outlet 7.

As exemplified in FIGURES 9 and 10, each of the six annular or short cylindrical sections 22 through 27 preferably comprises a pair of inturned annular end flanges 28 provided with aligned transverse apertures 29 and annular planar surfaces 30 disposed perpendicular to the longitudinal axis of the section. Each of the sections is also provided with a pair of inturned integral reinforcing annular ribs 31 and 32, each rib having converging surfaces 33 and 34 forming an annular seat or rest 35 for a partition 36. The end flanges 28 are also formed with inner surfaces 37 which are respectively disposed in converging relations to the surfaces 33 of the ribs 31 and 32 and in combination with the planar surfaces 30 assist in providing annular surfaces 38 of which portions serve to support other partitions. The surfaces 37 about the apertures 29 are preferably provided with small annular bearing areas 39. One of the end flanges is further provided with a plurality of preferably six equally spaced apart integral ears or lugs 40 extending radially inward so that a planar surface thereof constitutes a continuation of the surface 30 adjacent the annular seats 38. The rib 31 is similarly provided with a plurality of preferably six apertured ears 41 adjacent its annular seat 35 and the rib 32 with six apertured ears 42 adjacent its annular seat. It will be observed that all of the ears on the flange and ribs substantially correspond, that those on one of the end flanges are not offset laterally from its annular 30, and that the ears on the ribs are offset with respect to their seats in a direction toward the exit end of the cylinder. The circumferential staggering of the ears, among other things, offers a setup to facilitate drilling of the holes therein.

As clearly illustrated in FIGURES 9 and 10, each of the annular sections is provided with a plurality of groups or banks of peripheral slots, each group preferably being comprised of slots 43, 44, 45, and 46. The groups are equally spaced apart or separated circumferentially by bridge or intervening portions 47 and separated axially by the ribs 31 and 32. The slots are preferably of a zig-zag or wavy character and have side surfaces and curved end surfaces which converge outwardly. More specifically, the slots 43 have side surfaces 48, the slots 44 with side surfaces 49, the slots 45 with side surfaces 50, and the slots 46 with side surfaces 51. The side surfaces of the slots 43 and 46 nearest the end flanges substantially constitute continuations of the inner annular surfaces 37 of these flanges. The side surfaces 51 and 48 of the slots nearest the rib 31 constitute continuations of the annular surfaces 33 and 34 of this rib and the side surfaces 51 and 48 of the slots nearest the rib 32 similarly constitute continuations of the annular surfaces 34 and 33 of this rib. The aforementioned converging surfaces defining the slots assist in piloting and promoting movement of the ends of the beans B outwardly through the slots beyond the external peripheral or cylindrical surface of the cylinder where they are cut or snipped off by the knives carried by the knife assemblies. The shape of these slots and their arrangement facilitates entry and stabilization of the bean ends for efficient cutting.

Attention is directed to the fact that the wall thickness of each of the annular sections is appreciable and that the end flanges, ribs and bridging portions thereof are all designed and constructed to impact strength, uniformity, and stability to the structure, while avoiding internal sharp arrises or projections tending to cut or damage the beans and/or interfering with their flow or travel through the cylinder.

As alluded to above, one of the objects of the subject invention is to provide a cylinder with partitions which assist in serving to expeditiously and uniformly control the tumbling and flow of the beans whereby to materially increase the productive capacity of the machine as compared to my patented machines. More particularly in this regard, all the partitions 36 are substantially identical, and each, as depicted in FIGURES 6, 7 and 8, is in the form of a planar round disc provided with relatively large center non-circular opening 52, preferably rectilinear or square in shape and having rounded corners 53. Each of the partitions, adjacent its periphery, is also provided with a plurality of preferably six equally spaced apart holes 54.

As shown in FIGURES 7, 8 and 9, a partition 36, which may be referred to as a first partition, is secured on the annular seat 38 of the right end flange 28 and against the ears 40 by screws 55, or equivalent means, which extend through the apertures in the ears and the holes 54 in the partition. A partition, which may be referred to as a second partition, is similarly secured on the annular seat of the rib 32 and against the ears 42 in a relative rotative position different from that of the first partition, and a partition, which may be referred to as a third partition, is secured on the seat 35 of the rib 31 and against the ears 41 in a relative rotative position different from the first and second partitions so that the openings 52 in the partitions will be respectively located as shown from the exit end of the section in FIGURE 7. These partitions assist in defining preferably three annular chambers or pockets 56, 57 and 58 in each of the annular sections 22 through 27.

With this unique organization, the openings are staggered so that the corners of the partitions in each section of the cylinder, as viewed in FIGURE 7, are circumferentially spaced apart 60 degrees whereby when the machine is in operation and the cylinder is rotated the beans will be lifted upwardly toward the top of the cylinder so that the majority of the beans will fall back into one or more of the chambers and successively travel therethrough throughout the length of the cylinder and the marginal edges of the material defining the openings will promote or cause an abrupt interrupting or agitating effect to substantially prevent the beans from bridging across the tops of the openings. Otherwise expressed, the openings are preferably of such a character or configuration, that different portions defining the same promote the flow of the beans successively through the chambers. This setup of locating the particular opening shown out of registry with one another has proven most efficient in use and superior to the organization shown in my patent machines.

If further desirable, at least some of the partitions may be provided with threaded studs welded thereto as evidenced in FIGURE 8a so that those sides of the partitions facing the inlet end of the cylinder are completely smooth in order to avoid any internal obstructions which tend to damage or lift the beans.

As exemplified in FIGURE 9, the annular sections are preferably secured together by fasteners 59 which extend through the apertures 29 in the end flanges 28 for maintaining their planar surfaces 30 in intimate abutting relation. It will be observed that the heads of the bolts and the nuts comprising the fasteners engage the bearing areas 39 surrounding the apertures 29, and that the surfaces 37 of the abutting end flanges converge in substantially the same manner as the converging surfaces of the ribs 31 and 32, and that the end flanges in combination are of substantially the same size as the ribs. The converging surfaces of the flanges and ribs tend to pilot or guide the beans toward the slots.

Referring now to the knife assemblies 4 and the mode of mounting them, there is illustrated in FIGURES 1 and 2 a plurality of preferably three horizontal cylindrical rods 60, 61 and 62 having their ends respectively fixedly secured to the arcuate members 12 and 13 so that the rods are equally spaced circumferentially about the longitudinal axis of the cylinder. A plurality of preferably six knife assemblies are carried by each of the rods so that a plurality of preferably three will be generally vertically disposed in relation to each of the annular sections 22 through 27. It will be observed that the rods and knife assemblies are preferably located in a predetermined partial cylindrical zone. Since all of the knife assemblies are substantially identical, a description of one is considered to be sufficient.

Figure 4:
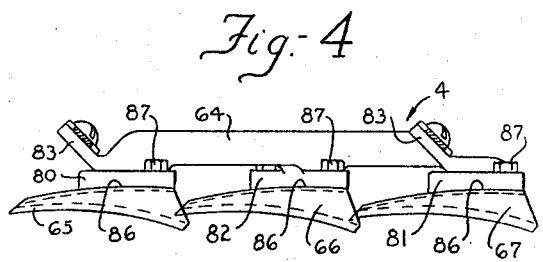
FIGURE 4 is a transverse sectional view taken substantially on line 4—4 of FIGURE 3.
Figure 5:
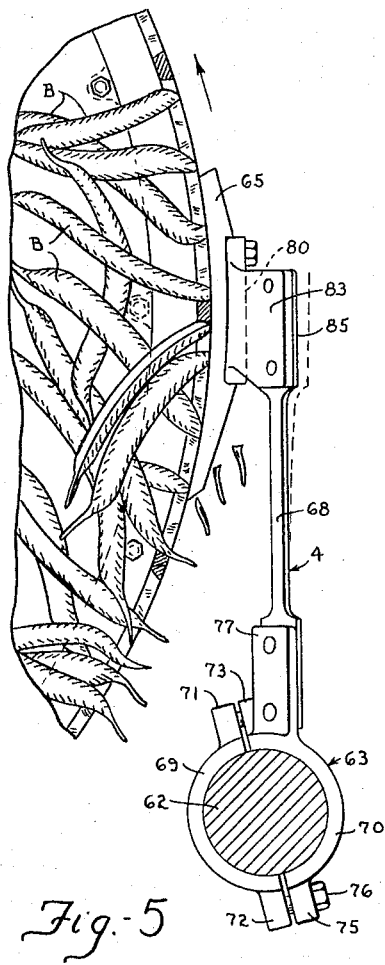
FIGURE 5 is an enlarged partial sectional end view of the cylinder and a knife assembly depicting the latter in operative relationship with the cylinder and in the act of removing the ends of the beans.
Figure 3:
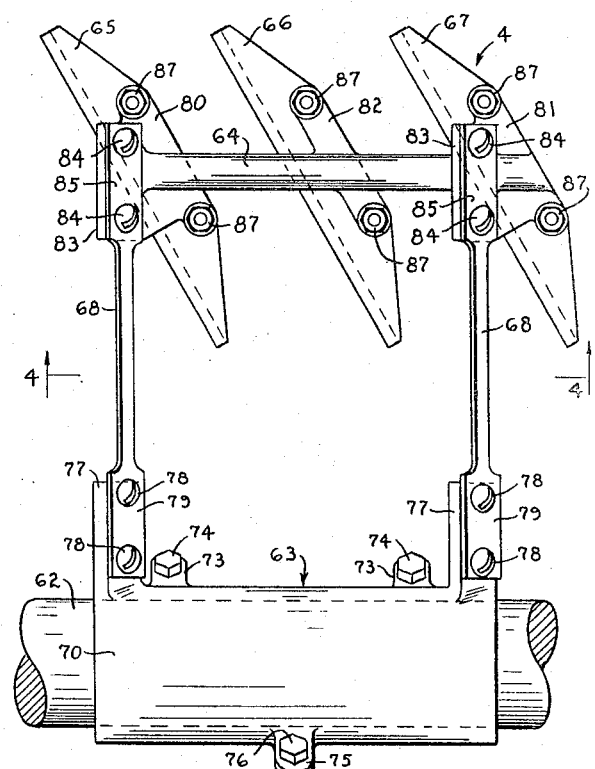
FIGURE 3 is an enlarged side elevational view of one of a plurality of knife assemblies which are employed for shearing off the ends of the beans.

Each of the knife assemblies, as stated above, embodies improved principles of design and construction. More specifically, each assembly, as depicted in FIGURES 3, 4, and 5, preferably comprises an attaching means generally designated 63, a rigid bar 64 supporting knives 65, 66 and 67, and resiliently flexible means, preferably in the form of a pair of planar members or leaf springs 68 operatively connecting the bar and attaching means. The attaching means 63 may be designed and constructed in various ways but, as shown, it is preferably comprised of a split cylindrical sleeve having semicylindrical complementary parts 69 and 70. The part 69 has a pair of lugs 71 provided with threaded holes and a third lug 72 provided with a threaded hole. The part 70 has a pair of lugs 73 with screws 74 extending through these lugs into connection with the threaded holes in the lugs 71. The part 70 also an apertured lug 75 with a screw 76 extending through this lug into connection with the threaded hole in the lug 72. With this setup each attaching means can be readily adjustably secured in any desired position on a mounting rod for varying the pressure exerted by the springs for applying the desired pressure of the knives against the periphery of the cylinder. The part 70 of the attaching means also has a pair of parallel planar integral offsets 77 at its ends, each offset being provided with a pair of threaded apertures which receive screws 78 extending through enlarged extremities 79 of the leaf springs. It will be observed that the offsets 77 are disposed in spaced parallel relation and perpendicular with reference to the longitudinal axis of the attaching means; that the enlarged extremities 79 of the springs engage the inner surfaces of the offsets; that the lugs 71 and 73 and screws 74 are located between the offsets; and that the lugs 72 and 75 and screw 76 are disposed substantially diametrically opposite the lugs 71 and 73.

The extremities of the rigid bar 64 are provided with a pair of integral offsets 80 and 81 and an offset 82 between the offsets 80 and 81. These offsets are arranged at oblique angles with respect to the longitudinal axis of the bar. The ends of the bar are also provided with a pair of transverse parallel integral offsets 83 disposed at oblique angles with respect tot he longitudinal axis of the bar. The offsets 83 are provided with planar surfaces disposed in substantially the same planes as the planar surfaces of the offsets 77 and screws 84, or equivalent means, extend through holes provided therefor in enlarged extremities 85 of the springs 68 for securing the latter to the offsets 83. The offsets 80, 81 and 82 are provided with concave seats 86 and the knives 65, 66 and 67 are respectively secured against or in the seats by pairs of fasteners, preferably in the form of bolts 87 extending through holes provided therefor in the offsets and knives, the ends of the offsets being located on opposite sides of the longitudinal axis of the bar.

Referring to FIGURES 11 through 15 of the drawing, there is exemplified one of a number of knife assemblies, embodying improved principles of design, which may be utilized in lieu of the knife assemblies described above. More specifically, each assembly, as depicted in FIGURES 11, 12 and 13, preferably comprises an attaching means generally designated 100, a relatively heavy rigid bar 101 supporting resiliently flexible knives 102, 103 and 104, and resiliently flexible means, preferably in the form of a pair of planar members or leaf springs 105 operatively connecting the bar and attaching means. The attaching means 100 may be designed and constructed in various ways but, as shown, is is preferably comprised of a split cylindrical sleeve having semi-cylindrical complementary parts 106 and 107. The part 106 has an upper pair of lugs 108 provided with apertures and a third lower lug 109 provided with an aperture. The part 107 has a pair of apertured lugs 110. Bolts 111 extend through the apertures in the lugs 108 and 110. The part 107 also has an apertured lug 112 with a bolt 113 extending through this aperture and an aperture in the lug 109. With this setup the attaching means of the knife assembly constitutes a primary means which can be readily adjustably secured in any desired position on a mounting rod by tightening and loosening the bolts 111 and 113 for varying the pressure exerted by the springs for applying the desired pressure of the knives against the periphery of cylinder. It will be observed that the split cylindrical sleeve is preferably truncated in order to accentuate the clamping action at three balanced localized areas. The part 107 of the attaching means also has a pair of parallel planar integral offsets 114 at its ends, each offset being provided with a pair of apertures which receive a pair of bolts 115 extending through holes 115' enlarged extremities 116 of the leaf springs 105. It will be observed that the offsets 114 are disposed perpendicular in planes which are oblique with reference to the longitudinal axis of the attaching means; that the enlarged extremities 116 of the springs respectively engage the outer surfaces of the offsets; that the lugs 108 and 110 and bolts 111 are located between the offsets; and that the lugs 109 and 112 and bolts 113 are disposed substantially midway between the lugs 108 and 110 on the opposite side of the mounting.

The extremities of the rigid bar 101 are provided with a pair of integral offsets 117 and 118 and an offset 119 between the offsets 117 and 118. These offsets are preferably arranged at oblique angles with respect to the longitudinal axis of the bar. The ends of the bar are also provided with a pair of transverse parallel integral offsets 120 disposed perpendicular in parallel planes with respect to the longitudinal axis of the bar. The offsets 120 are provided with planar surfaces and adjacent inclined surfaces 121. The springs 105 have enlarged extremities 122 with offset portions 123. These extremities are respectively held against the planar surfaces of the offsets 120 by pairs of bolts 124. It will be observed that portions of the extremities 122 are slightly spaced relative to the surfaces 121 in order to provide clearance for pivoting of the knife unit relative to the springs. As shown in FIGURES 14 and 15, the offset portion 123 of each of the pair of springs is provided with a small aperture 125 and a larger aperture 126. The bolts 124 extend through holes in the offsets 120 and through the apertures 125 and 126 to provide a stable adjustable connection between the bar 101 and the components carried thereby and the outer extremities of the springs 105 whereby the bar and knives constituting a unit may be adjusted relative to the springs to correctly position the knives against a cylinder. This may be readily accomplished by merely loosening the bolts 124, manipulating or pivoting the unit about the axes of the outermost bolts, allowed by the larger apertures 126, to the desired position and then tightening the bolts. This organization or setup constitutes a secondary means of adjustment in addition to the attaching means 100.

The offsets 117, 118 and 119 are provided with concave seats 127' and the knives 102, 103 and 104 are respectively secured against or in the seats by pairs of fasteners, preferably in the form of bolts 133 extending through holes provided therefor in the offsets and knives. It will be observed that the ends of the offsets 117, 118 and 119 are located on opposite sides of the longitudinal axis of the bar.

Attention is directed to the fact that the weight of the bars or holders supporting the knives of both of the structures described above is relatively heavy or sufficient to see that the knives will not move sideways when momentarily cutting off the end of a bean, thereby preventing chatter and causing the knives to ride smoothly on the cylinder. Any knife or any knife holder which is light in weight is undersirable for use with the particular cylinder structure shown because the beans strike the knife edges, the knives will be slightly moved which, in turn, causes the knives to chatter against the cylinder causing wear on the cylinder and undesirable noise.

Of further significance is that face that each of the knives is elongate and provided with a bevelled cutting edge 127 extending throughout its length. Each knife is relatively narrow in width which is determined by the cutting edge 127 and an opposite parallel edge 128. Each knife preferably includes what may be termed a rectangular central portion 134 and inner and outer generally triangular extremities. The outer extremity which is shorter than the inner extremity, is defined by the cutting edge 127, an edge 129 perpendicular to the edge 127, and an edge 130 disposed oblique to the edges 127 and 129. The inner extremity of each knife which is somewhat longer than the outer extremity is defined by the cutting edge 127, a transverse edge 131 and an edge 132, the latter being disposed obliquely to the edges 127 and 131. The end of the inner extremity of each of the knives is preferably offset rearwardly at an angle of approximately 30 degrees with respect to the remainder of the knife so as to prevent the knives from gouging into the cylinder.

Referring to FIGURE 16 there is exemplified a modified mode whereby a knife unit may be adjustably connected to resiliently flexible members or springs as distinguished from the adjustable structure illustrated in FIGURES 14 and 15.

More particularly, numeral 200 designates an offset corresponding to the offset 120, above referred to, and 201 one of a pair of springs corresponding to the springs 105. Each of the springs 201 includes an enlarged extremity 202 and this extremity is provided with a pair of holes 203 and 204 which are of the same diameter. The offset 200 is provided with an aperture of a diameter substantially corresponding to that of 204 and is aligned with the latter. This offset is further provided with an aperture 205 of a larger diameter and bolts 206 and 207 extend through the apertures in the offset and the extremity and provide an organization whereby the knife unit may be pivoted about the axis of the bolt 207, due to the enlarged aperture 205, to enable the knife unit to be correctly positioned with respect to the cylinder. Thus, a mere loosening of the bolts 206 and 207, manipulation of the unit to the desired angular position, and then tightening of the bolts is all that is required in order to obtain a correct adjustment.

It is to be understood that although bolts are employed to operatively connect components of the knife assembly together, any equivalent means, such as screws in certain locations may be employed.

The knife assemblies above described constitute an improvement over any other known knife assembly being utilized in the trade, and particularly over the single knife or blade as employed and shown in my Patent Number 2,114,730. In this patent, a knife edge cutting a bean end may be momentarily twisted, causing the knife edge to gouge into the peripheral surface of the cylinder. The double knife structure illustrated in my Patent Number 2,705,516, also has certain disadvantages because in some instances when a bean end or some foreign object strikes the edge of a right knife, the knife assembly may momentarily twist about the single spring and cause the knife edge to gouge the surface of the cylinder. Also, in such an organization, when the knife strikes some foreign object, the knife will be released from the cylinder and remain away until it is manually reset against the cylinder. In practice, this setup has been found to be inefficient, due to the number of manual operations required in resetting of the knives back to their normal or correct operating positions against the cylinder.

The improved knife assemblies disclosed herein are very stable in operation due to the fact that three knives of each assembly are caused to bear against the cylinder. In such an arrangement it is not possible for the knives to twist from their correct positions because of the character and angle positioning of the springs 68. With this unique structure, if a foreign object such as a nail or piece of wood should strike a knife edge, all of the knives of the assembly will be pushed obliquely away from the cylinder until the object has moved past the knife, whereupon the knives automatically move back to their respective correct operating positions against the cylinder.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. An assembly of the kind described, said assembly comprising attaching means whereby said assembly may be attached to a mounting, a bar having extremities and provided with spaced portions for respectively supporting elongate knives transversely of said bar, and a pair of resiliently flexible members disposed in parallel relation respectively joining said attaching means and said extremities of said bar and providing the sole means for supporting the latter for movement relative to said attaching means.

2. An assembly provided with knives adapted for engagement with a peripheral surface of a rotatable cylinder, said assembly comprising an elongate fitting for attachment to mounting means, a bar having extremities and provided with spaced portions respectively supporting said knives in a plane generally parallel to the longitudinal axis of said bar and at oblique angles with respect to said bar, and resiliently flexible members disposed in parallel relation having ends connected to said fitting and to said extremities of said bar for resiliently supporting and maintaining the latter in substantially parallel relation to said fitting.

3. An assembly provided with knives adapted for engagement with a peripheral surface of a rotatable cylinder, said assembly comprising clamping means, elongate rigid supporting means having extremities and backing portions for respectively supporting said knives transversely with respect to said supporting means, and a pair of leaf springs disposed in parallel relation having ends connected to said clamping means and to said extremities of said supporting means.

4. An assembly provided with knives adapted for engagement with a peripheral surface of a rotatable cylinder, said assembly comprising an elongate fitting for attachment to mounting means, a rigid bar having extremities and provided with spaced portions extending crosswise of said bar and respectively supporting said knives at oblique angles with respect to said bar, and a pair of resiliently flexible members disposed in parallel relationship and having ends respertively joining said fitting and said extremities of said bar for resiliently supporting and maintaining said bar in a predetermined spaced relation to said fitting.

5. An assembly provided with precurved knives adapted for engagement with a peripheral surface of a rotatable cylinder, said assembly comprising an elongate split cylindrical sleeve, and means provided on the latter whereby to facilitate its adjustable securement to a mounting rod, a bar having extremities and provided with portions at said extremities and at a location therebetween supporting said knives substantially in parallel relation with respect to one another and transversely with respect to said bar, said sleeve also being provided with a pair of substantially corresponding offsets, and a pair of elongate leaf springs having ends secured to said offsets and also ends secured to said extremities of said bar for resiliently supporting said bar and knives for movement relative to said sleeve.

6. The assembly defined in claim 5, in which said offsets on said sleeve and said extremities of said bar are provided with relatively large seat bearing areas, and said ends of said springs are enlarged and engage said bearing areas.

7. An assembly for the purpose described, said assembly comprising attaching means whereby said assembly may be attached to a mounting, an elongate rigid bar having extremities and an intermediate area provided with spaced portions extending crosswise of said bar for respectively supporting knives transversely with respect to said bar, and a pair of elongate resiliently flexible members having ends connected to said attaching means and also ends connected to said extremities of said bar for resiliently supporting said bar for movement relative to said attaching means.

8. The assembly defined in claim 7, in which said members are planar with their planes disposed at oblique angles with reference to the longitudinal axis of said bar.

9. An assembly provided with knives adapted for engagement with a peripheral surface of a rotatable cylinder, said assembly comprising a rigid bar provided with spaced backing portions extending crosswise of said bar and respectively supporting said knives at oblique angles with respect to said bar, a pair of leaf springs extending laterally from said bar, and means for attaching said springs to a mounting.

10. The assembly defined in claim 9, in which said backing portions are elongate and provided with means for securing the knives thereto at locations on opposite sides of said bar.

11. In combination: a rotatable cylinder provided with slots interrupting its periphery, means for rotating said cylinder whereby portions of a product may protrude through the slots, an elongate mounting extending alongside said cylinder, a fitting carried by said mounting, a rigid bar provided with spaced portions respectively supporting precurved knives at oblique angles with respect to said bar for engaging the peripheral surface of said cylinder for cutting the protruding portions of the product, resiliently flexible members disposed in parallel relation having ends connected to said bar and also ends connected to said fitting for supporting and maintaining said bar in spaced relation to said fitting, and means carried by said fitting affording adjustment and securement of said fitting on said mounting whereby the pressure of said knives against said periphrey may be varied by controlling the tension of said members.

12. An assembly for the purpose described comprising an elongate rigid bar, said bar having a side provided with a plurality of integral offsets, said offsets being disposed transverse to the longitudinal axis of said bar and being provided with corresponding concave seats, a plurality of corresponding knives respectively engaging said seats, means for fixedly maintaining said knives in engagement with said seats, said bar having another side provided with a pair of longitudinally spaced integral offsets located adjacent ends of said bar, said last-mentioned offsets being provided with planar surfaces disposed in spaced parallel relation and at oblique angles with respect to said longitudinal axis of said bar, a pair of elongate leaf springs having enlarged extremities, and means carried by said last-mentioned offsets for respectively securing said enlarged extremities against said surfaces of said offsets.

13. In combination: elongated knife supporting structure, elongated attaching means whereby the structure may be mounted, a pair of elongate resiliently flexible means having pairs of extremities, means connecting one pair of said extremities to said attaching means, and means connecting the other pair of said extremities to said knife supporting structure whereby the latter is supported solely by said resiliently flexible means, at least one said connecting means affording relative adjustment between the components connected thereby.

14. A subassembly comprising a pair of elongate springs having two pairs of extremities, relatively heavy bar means supporting a plurality of parallel knives disposed in a plane generally parallel to and at oblique angles with respect to the longitudinal axis of the bar, means connecting one of said pairs of extremities to said bar, and said other pair of extremities being provided with means facilitating their attachment to a support.

15. An assembly of the kind described, said assembly comprising attaching means whereby said assembly may be attached to a fixed mounting, a bar having extremities and provided with spaced offset elongated parallel portions having axes disposed crossways to the longitudinal axis of said bar for respectively supporting individual elongate knives, and elongated resiliently flexible means having extremities respectively connecting said attaching means and said bar for supporting the latter for movement relative to said attaching means.

16. An assembly provided with knives adapted for engagement with a peripheral surface of a rotatable inclined cylinder, said assembly comprising attaching means whereby to facilitate its adjustable securement to a mounting, a bar having extremities and provided with elongated portions at said extremities and with an elongated portion at a location therebetween supporting said knives substantially in parallel relationship, said portions and said knives having axes extending crossways of and at oblique angles with respect to the longitudinal axis of said bar, said attaching means being provided with seat means, said bar being provided with seat means located intermediate its extremities, elongated resiliently flexible means having ends respectively connected to said seat means and providing the sole support between said attaching means and said bar.

17. An assembly provided with elongated knives adapted for engagement with a peripheral surface of a rotatable inclined cylinder, said assembly comprising a rigid bar provided with parallel elongated backing portions having axes extending crossways with respect to the longitudinal axis of said bar, attaching means, and elongated resiliently flexible means having extremities respectively connected to said attaching means and said bar providing the sole means for supporting the latter and said knives as a unit in spaced relation with respect to said attaching means.

18. A supporting structure of the character described, said structure comprising an elongated rigid bar, said bar being provided with a pair of substantially corresponding elongated portions which are joined integrally with the ends of said bar for parallel disposition with respect to one another and at one side of said bar and having axes disposed crossways of and at oblique angles with respect to the longitudinal axis of said bar, said elongated portions being provided with seats and with means for fixedly securing elongate knives against said seats, said bar also being provided with offset seat means, and means whereby elongated resiliently flexible means may be secured against said seat means for resiliently supporting said knife supporting structure for movement relative to a mounting.

References Cited by the Examiner
UNITED STATES PATENTS

| | | | |
|---|---|---|---|
| 735,662 | 8/1903 | Gent | 146—98 X |
| 1,336,991 | 4/1920 | Urschel | 146—86 |
| 2,518,598 | 8/1950 | Buck | 146—86 |
| 2,705,516 | 4/1955 | Urschel | 146—86 |
| 3,102,567 | 9/1963 | Hamilton | 146—86 |

WILLIAM W. DYER, JR., *Primary Examiner.*

W. GRAYDON ABERCROMBIE, *Examiner.*